US007900335B2

(12) United States Patent
Vaes

(10) Patent No.: US 7,900,335 B2
(45) Date of Patent: Mar. 8, 2011

(54) METHOD AND SYSTEM FOR PROFILING AND MANUFACTURING CURVED ARCHES

(76) Inventor: Ed Vaes, Hamilton (CA)

( * ) Notice: Subject to any disclaimer, the term of this patent is extended or adjusted under 35 U.S.C. 154(b) by 954 days.

(21) Appl. No.: 11/750,450

(22) Filed: May 18, 2007

(65) Prior Publication Data

US 2007/0288118 A1 Dec. 13, 2007

Related U.S. Application Data

(60) Provisional application No. 60/804,103, filed on Jun. 7, 2006.

(51) Int. Cl.
*B23P 17/00* (2006.01)
*B27M 3/00* (2006.01)
*B27M 1/08* (2006.01)

(52) U.S. Cl. ........... 29/558; 409/131; 409/199; 144/354; 144/367; 144/371

(58) Field of Classification Search ............ 29/557–558, 29/56.5; 144/344–345, 354, 355, 359–360, 144/371, 369, 367; 409/131–132, 199; 238/10 B, 238/10 E, 10 F
See application file for complete search history.

(56) References Cited

U.S. PATENT DOCUMENTS 3,561,176 A 2/1971 Sitterly
3,975,872 A 8/1976 Pinero
4,356,849 A * 11/1982 Fredrickson .................. 409/130
RE31,565 E 4/1984 Beaulieu
4,628,560 A 12/1986 Clevett et al.
4,688,612 A * 8/1987 Kessel et al. ................... 144/3.1
4,776,139 A 10/1988 Lockwood
RE34,994 E * 7/1995 Bonyman ................... 144/253.6
5,787,948 A * 8/1998 Fadyk ........................... 144/130
6,016,854 A * 1/2000 Ziegler ....................... 144/135.2
6,076,574 A * 6/2000 Fadyk ........................ 144/134.1
6,648,237 B2 * 11/2003 Rothkopf et al. ........... 238/10 E
6,962,180 B2 * 11/2005 White ........................... 144/360
6,964,286 B2 * 11/2005 White ............................ 144/3.1
2007/0220729 A1 * 9/2007 Vaes ............................. 29/33 R

FOREIGN PATENT DOCUMENTS

WO WO-03/101687 A1 * 12/2003

* cited by examiner

*Primary Examiner* — Erica E Cadugan
(74) *Attorney, Agent, or Firm* — Jansson Shupe & Munger Ltd.

(57) ABSTRACT

A system and method for profiling and manufacturing curved arches includes cutting out the outer dimensions of individual curved sections from sheet material, each curved section including an outer radius, an inner radius, a top surface, a bottom surface, a male end and a corresponding female end. Assembling together the individual curved sections by joining interferingly end to end male ends with female ends to form an assembled curved section. Milling a profile into the top surface of the assembled curved section thereby resulting in an assembled curved section with a profiled top surface.

6 Claims, 11 Drawing Sheets

FIG. 19
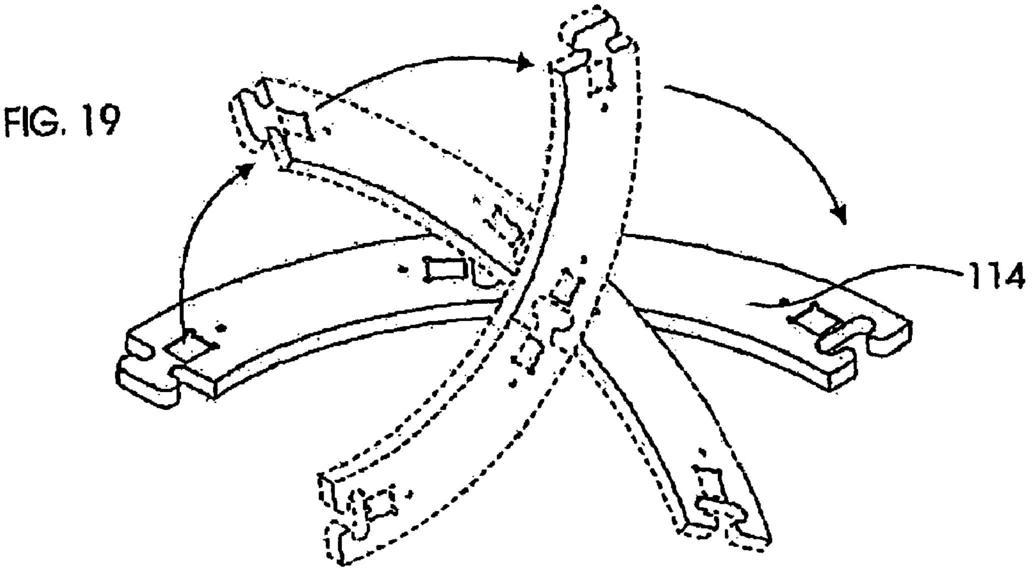
FIG. 20
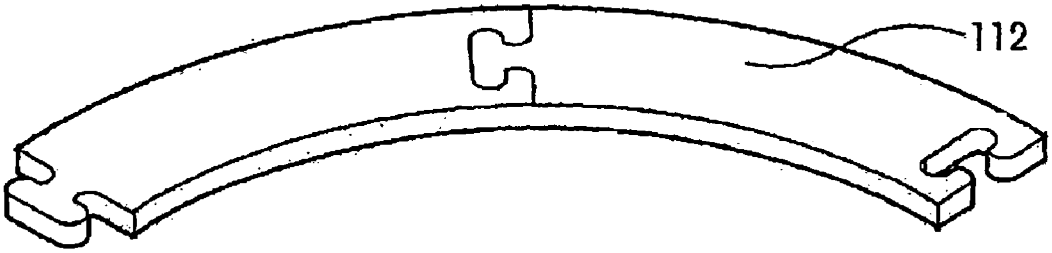
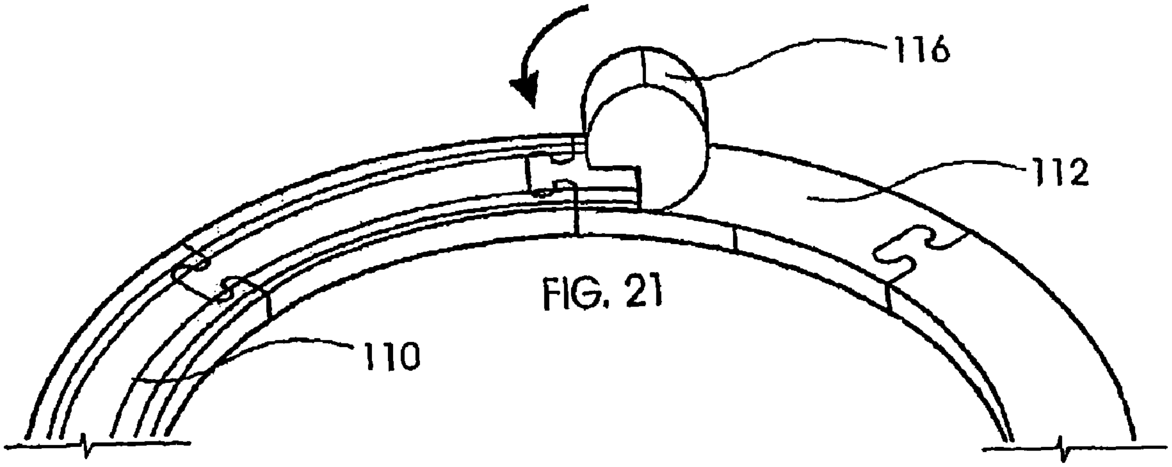
FIG. 21

METHOD AND SYSTEM FOR PROFILING AND MANUFACTURING CURVED ARCHES

The application claims priority from previously filed U.S. Provisional Patent Application No. 60/804,103, titled "METHOD AND SYSTEM FOR PROFILING AND MANUFACTURING CURVED ARCHES" on Jun. 7, 2006 by Ed Vaes.

FIELD OF THE INVENTION

Method, system and apparatus for profiling and manufacturing curved arches.

BACKGROUND AND SUMMARY

A system and method for profiling and manufacturing curved arches includes cutting out the outer dimensions of individual curved sections from sheet material, each curved section including an outer radius, an inner radius, a top surface, a bottom surface, a male end and a corresponding female end. Assembling together the individual curved sections by joining interferingly end to end male ends with female ends to form an assembled curved section. Milling a profile into the top surface of the assembled curved section thereby resulting in an assembled curved section with a profiled top surface.

BRIEF DESCRIPTION OF THE DRAWINGS

FIG. 19 is a schematic perspective view of an arched section being flipped from the bottom surface facing upward to the top surface facing upward.

FIG. 20 is a top perspective view of two curved sections joined together with the top surface facing upwardly.

FIG. 21 is a top schematic perspective view of an assembled arch section being profiled.

DETAILED DESCRIPTION OF THE PREFERRED EMBODIMENTS

Figure 1:
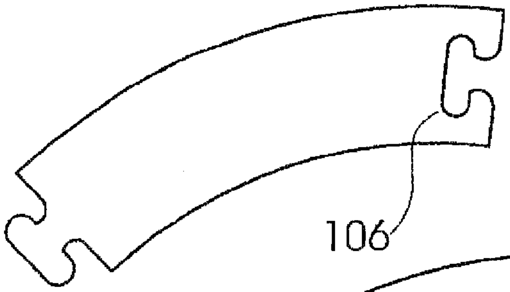
FIG. 1 is a top plan view of a curved section.
Figure 2:
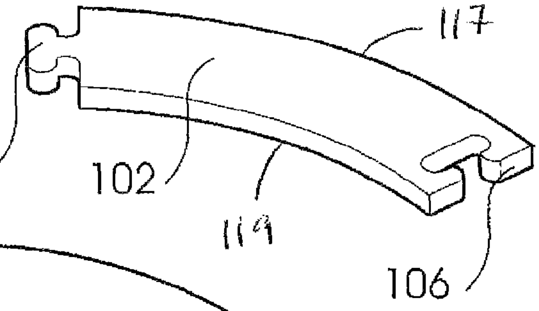
FIG. 2 is a top schematic perspective view of a curved section.
Figure 3:
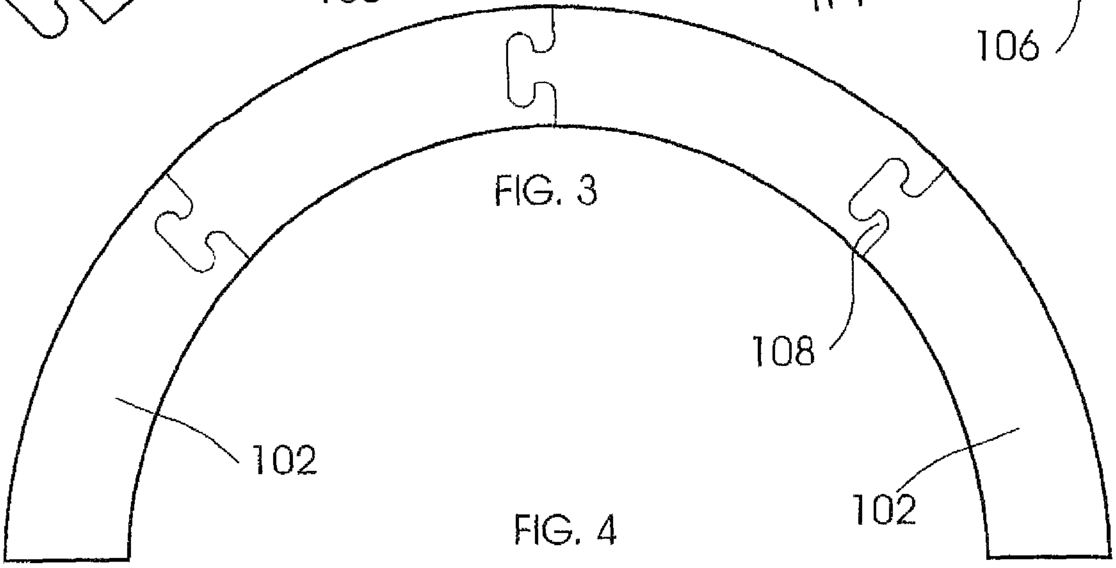
FIG. 3 is a top plan view of an assembled arch.

FIGS. 1 through 5 show a first embodiment of the method and system and apparatus for profiling curved arches which includes curved sections 102 having a female end 106 and a male end 104 which are interconnected together with an interference connection 108 as shown in FIGS. 1 through 5. Individual curved sections 102 are milled from planar material and male end 104 and female end 106 respectively are milled into the ends so that the male end 104 will fit interferingly together with female end 106 to provide for a connection between two curved sections 102 which can be taken apart. Each curved section has a top surface 112, a bottom surface 114, an outer radius 117 and an inner radius 119.

Figure 4:
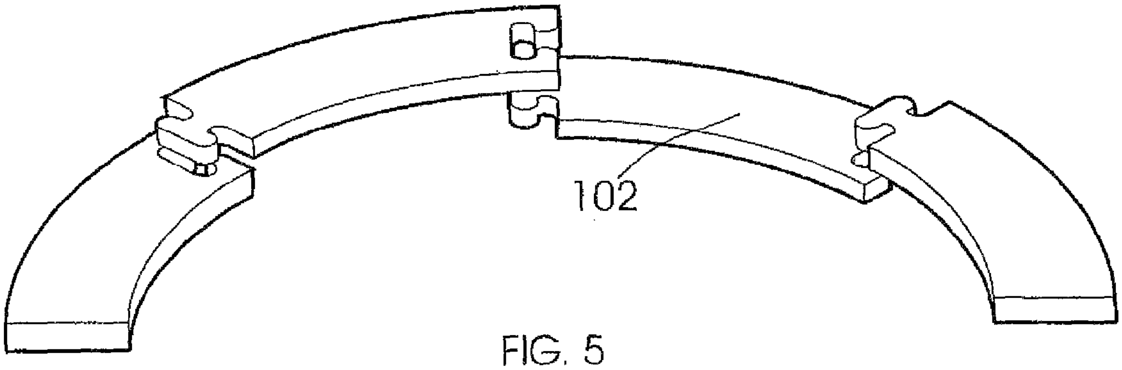
FIG. 4 is a top schematic perspective view of an arch being assembled.
Figure 5:
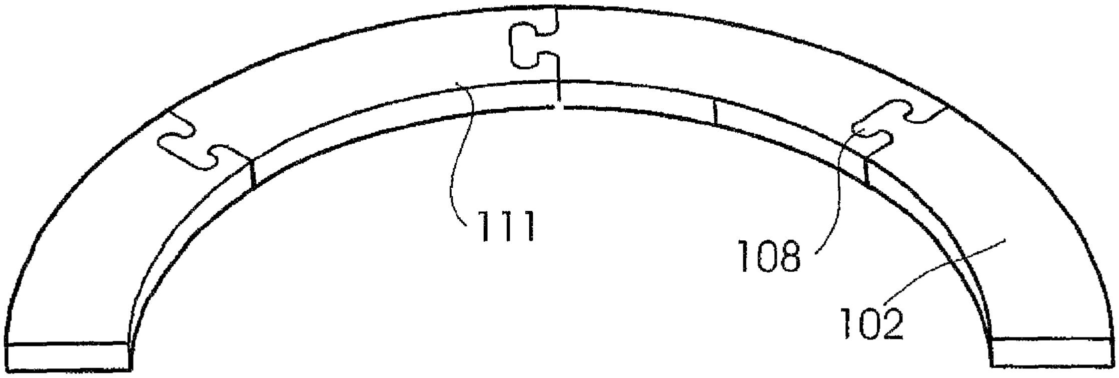
FIG. 5 is a top perspective view of an assembled arch.

FIG. 4 shows four curved sections 102 being assembled together by placing together female ends 106 with male ends 104 to produce an assembled curved section 111 as shown in FIG. 5.

FIGS. 7 through 11 shows an alternate embodiment namely, differently styled female end 106 and male end 104 which also can be used. A person skilled in the art will note that various different geometries for male end 104 and female end 106 can be successfully used in order to interferingly join together two curved sections 102 end to end to form an assembled curved section 111 as shown for example in FIGS. 5 and 11. The ends are not necessarily male and female in nature. The ends may also have male and female components on each end as is the case with a dovetail type connection. The ends may be joined by urging together the curved pieces in a plane perpendicular to the sheet material as shown in the figures but may also be joined by urging together the curved sections in a plane parallel to the sheet material such as a tongue and groove type connection.

Figure 6:
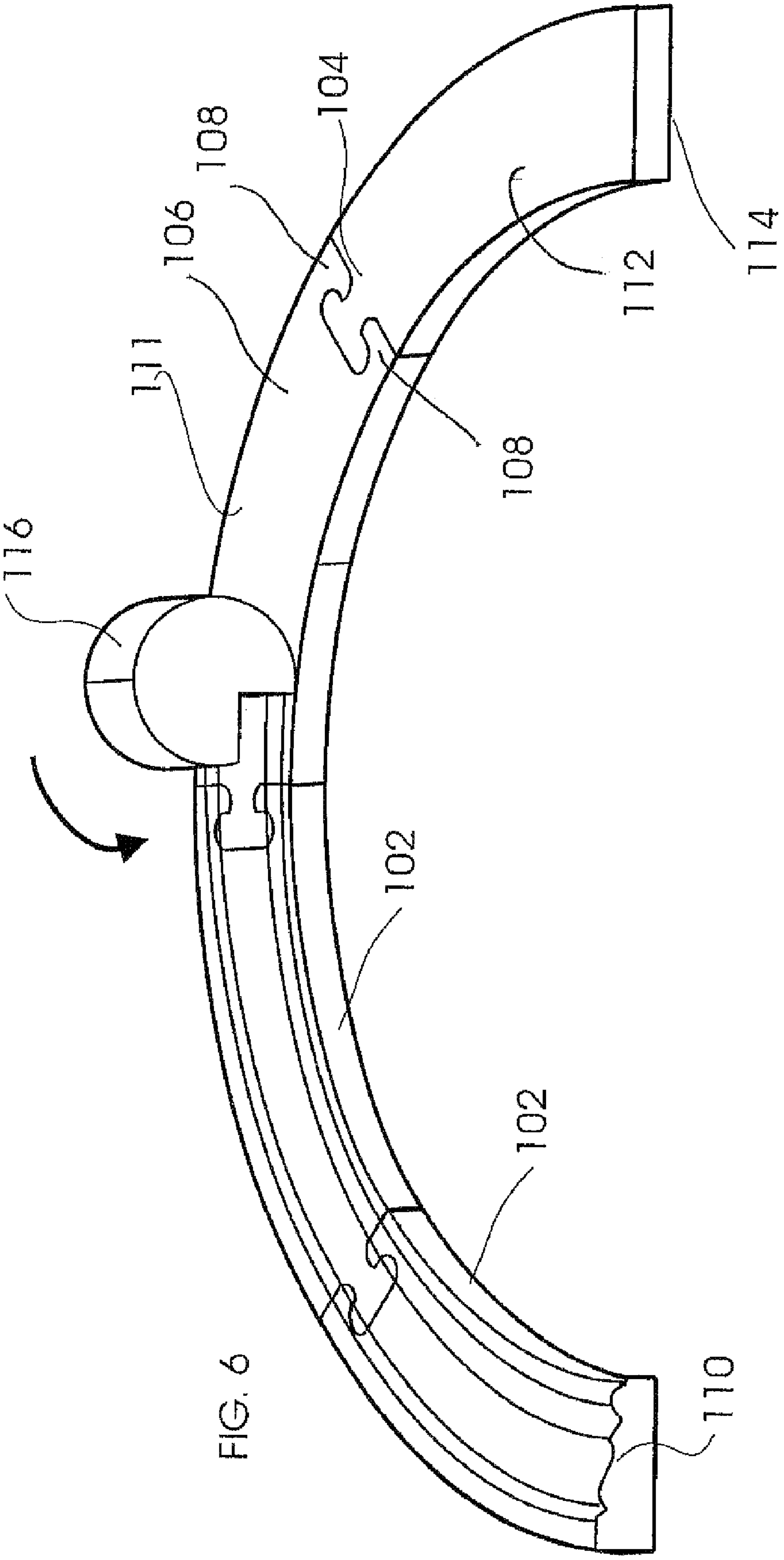
FIG. 6 is a top schematic perspective view of an arch being profiled.
Figure 7:
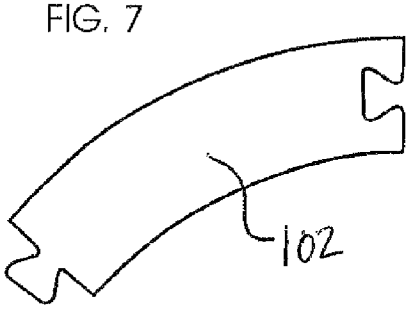
FIG. 7 is a top plan view of a curved section.
Figure 8:
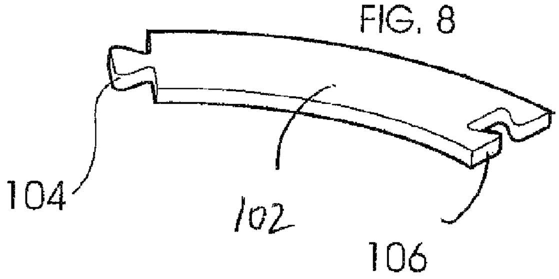
FIG. 8 is a top perspective view of a curved section.
Figure 9:
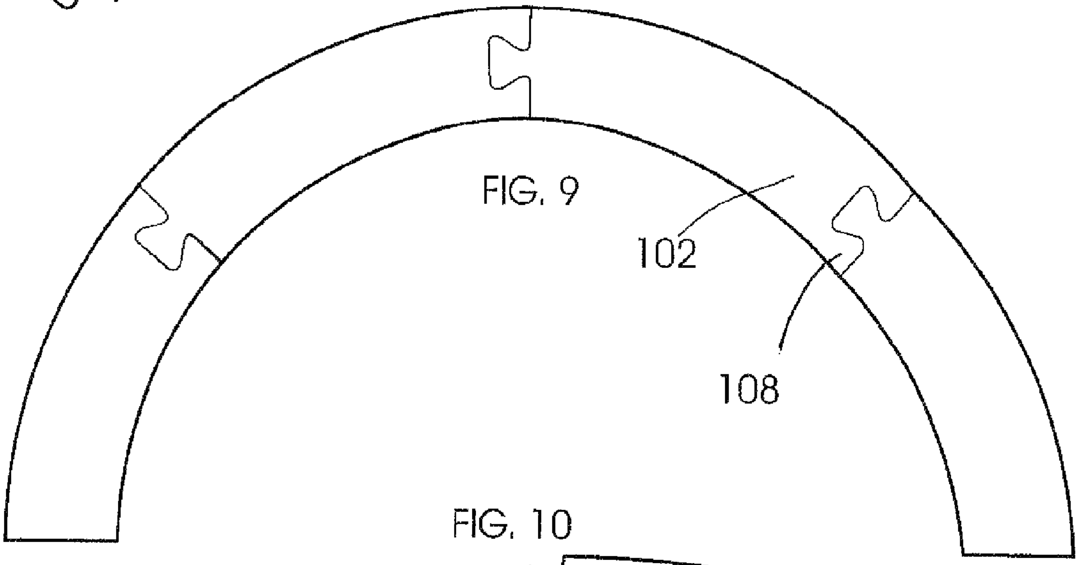
FIG. 9 is a top plan view of an arch.
Figure 10:
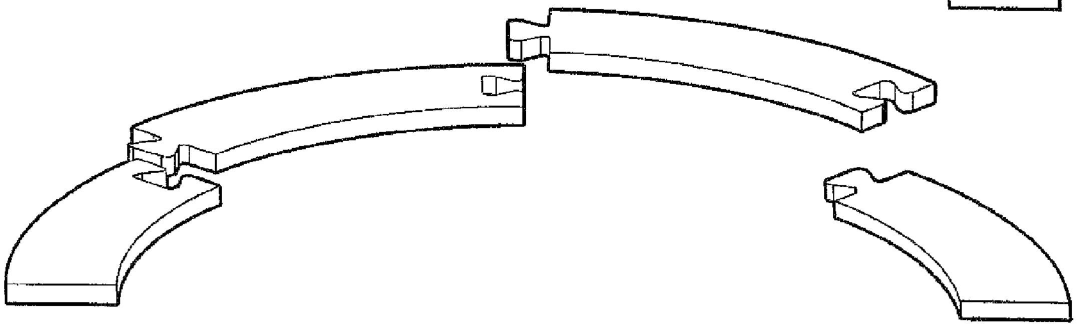
FIG. 10 is a top schematic perspective view of an arch being assembled.
Figure 11:
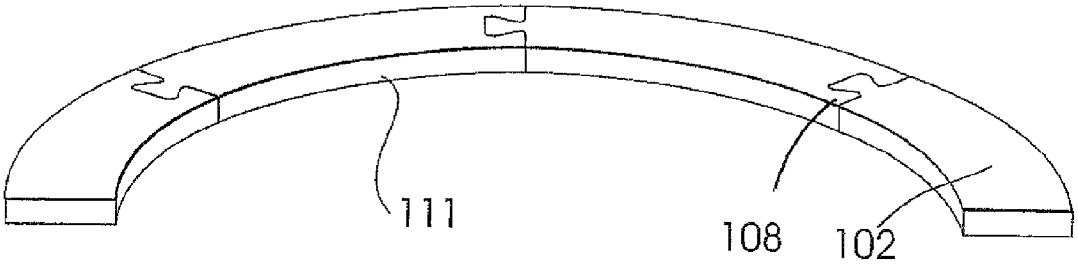
FIG. 11 is a top perspective view of an assembled arch.

FIG. 6 shows a top perspective view of an assembled curved section 111 being profiled with a profiling tool 116. In practice, an assembled curved section can be fed through a profiling machine which has a profiling tool 116 which will mill a profiled top surface 110 into top surface 112 of assembled curved section 111. The interference connection 108 holding together the four curved sections 102 is sufficiently rigid and strong enough in order for the assembled curved section 111 to pass through the profiling machine, wherein the profiling tool 116 will mill a profiled top surface 110 onto the assembled curve section 111.

A person skilled in the art will recognize that there is always a certain amount of waste associated with putting a continuous piece of material through a profiling machine. Particularly near the end there are snipes which are sections of material which are not uniformly milled due to the lack of proper support of the assembled curved section 111 as it enters the end portion of the profiling machine.

Therefore, it is advantageous to assemble together multiple curved sections 102 to form a longer assembled curved section 111 as depicted in FIG. 5 in order to minimize waste. The other option would be to profile individually each curved section 102 which would create significantly more waste at each end of curved section 102, since there would be a snipe at each end which would have to be discarded. Therefore by assembling multiple curved sections 102 together and then profiling the amount of snipe waste is minimized.

Figure 12:
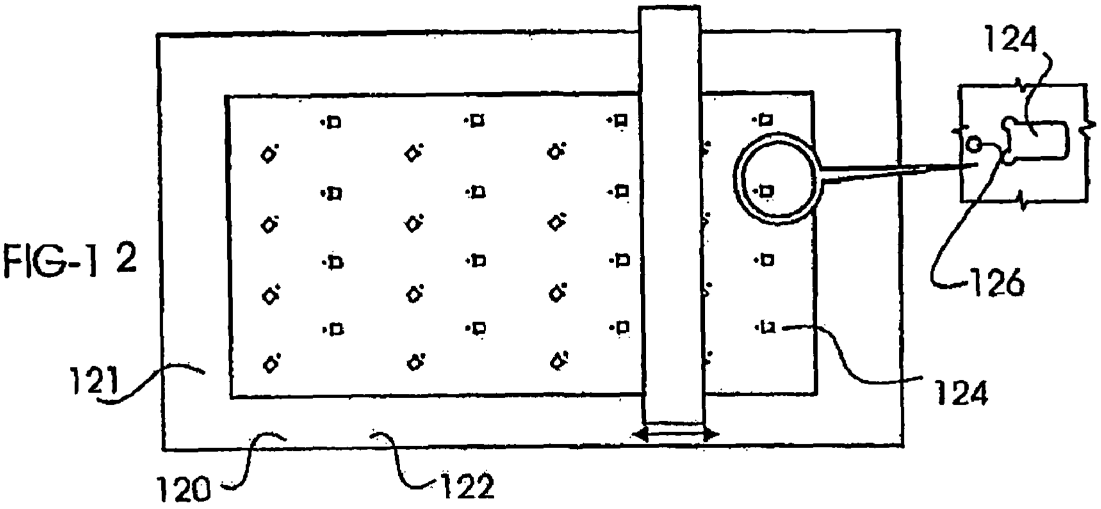
FIG. 12 is a top plan view of a CNC milling machine having a piece of sheet material placed thereon having milled hinged pockets and locating holes in strategic locations.

FIG. 12 and following show the manufacturing steps required in order to produce the curved arches.

Figure 13:
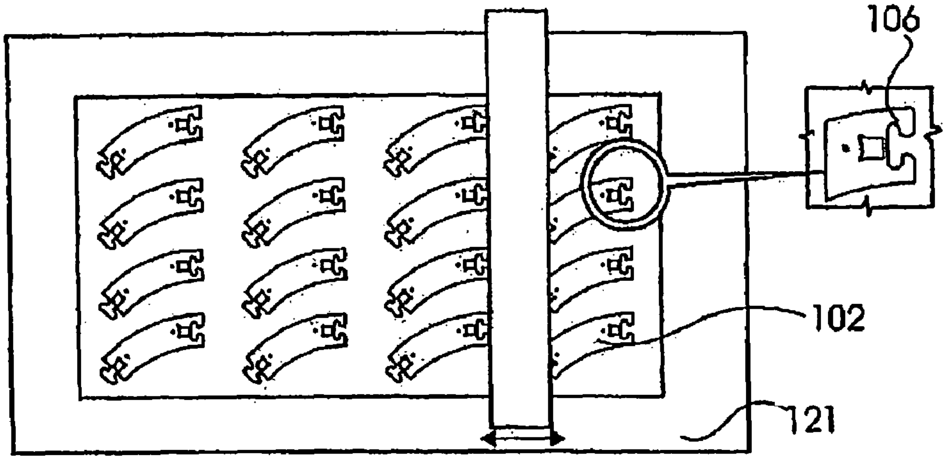
FIG. 13 is a top plan view of a CNC milling machine having sheet material placed thereon showing cut out of curved sections defined on the sheet material.
Figure 14:
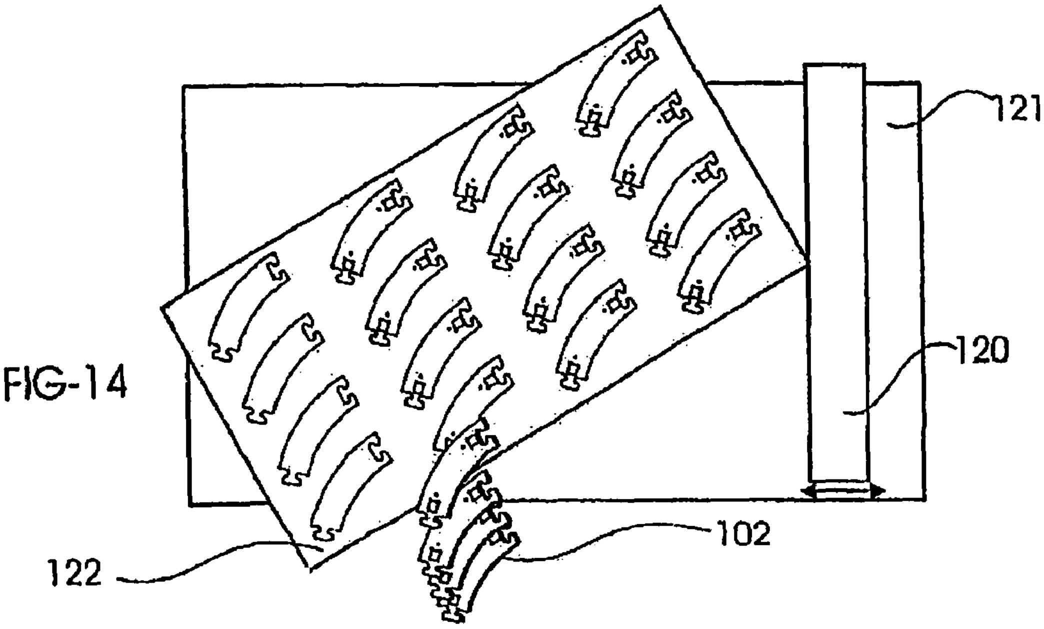
FIG. 14 is a top perspective schematic view of sheet material being removed from CNC milling lathe with curved sections being removed from the sheet material.
Figure 15:
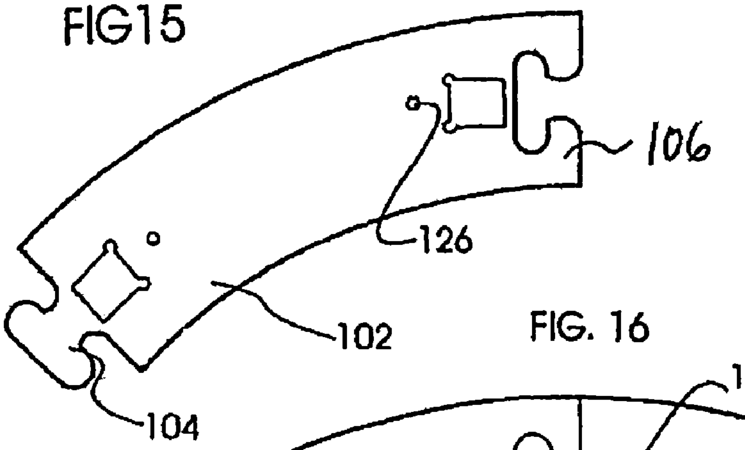
FIG. 15 is a bottom plan view of a curved section.
Figure 16:
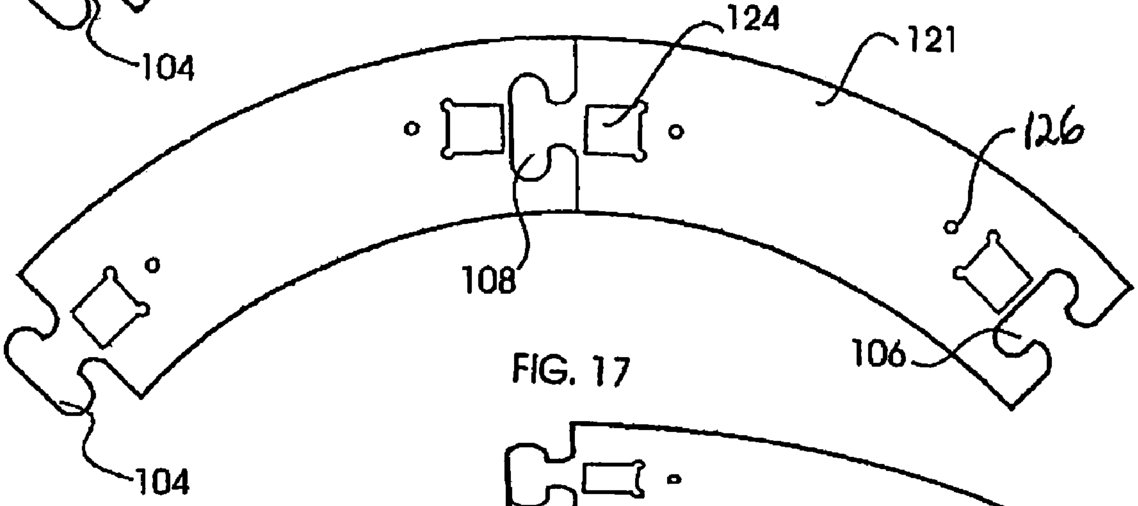
FIG. 16 is a bottom plan view of two curved sections joined together.
Figure 17:
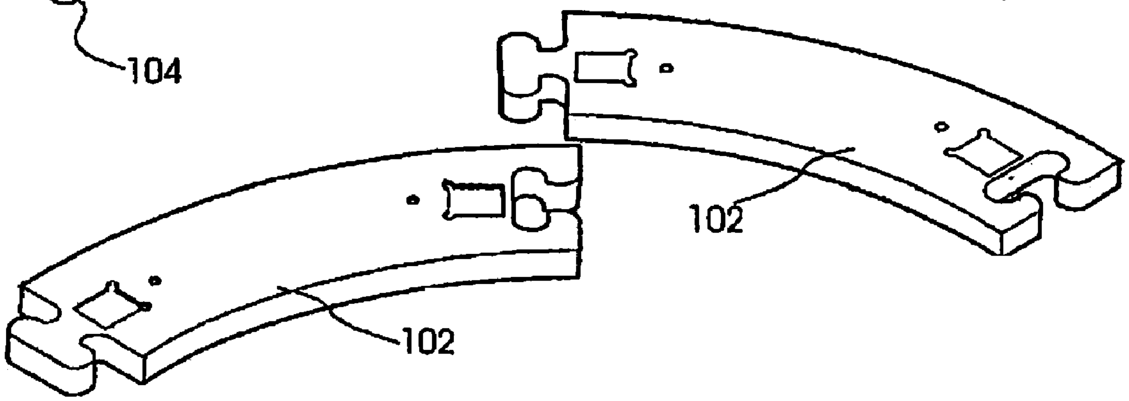
FIG. 17 is a top schematic perspective view of two curved sections being joined together.
Figure 18:
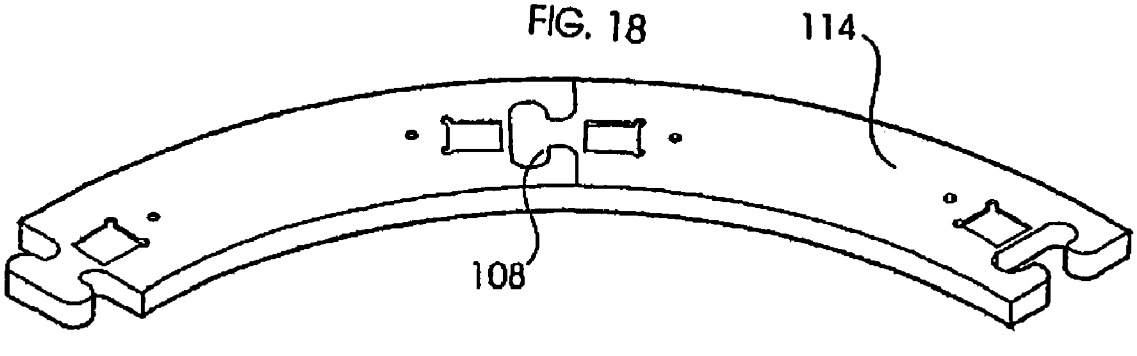
FIG. 18 is a bottom schematic perspective view of two curved sections joined together with an interference connection.
Figure 22:
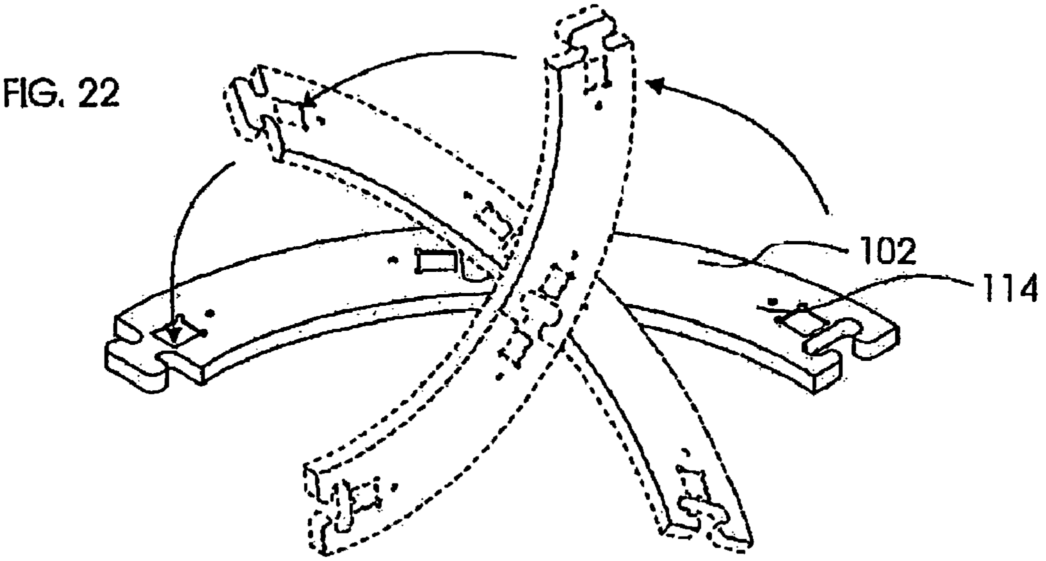
FIG. 22 depicts schematically the curved arch section being turned back onto its bottom surface facing upwardly.

FIG. 12 shows a sheet material 122 which can be plywood, MDF (medium density fiber board), solid wood, plastic, foam or any other type of sheet material suitable for making curved arch sections. Sheet material 122 is placed onto table top 121 of a CNC milling machine 120. Initially hinged pockets 124 and locating holes 126 are milled out of the sheet material 122 in strategic locations. Next as shown in FIG. 13, the outer dimensions of each individual curved section 102 is cut and milled through the sheet material 122 so that they can be removed as shown in FIG. 14 from the sheet material 122. In this manner, curved sections 102 having a top surface 112 and bottom surface 114 which are generally flat and planar is produced together with male ends 104 and female ends 106 which can be interferingly placed together to produce an interference connection 108 when two ends are connected together. FIGS. 15 and 16 shows the bottom surface 114 of the curved section 102, the reader will note that there is a hinge pocket 124, together with locating holes 126 located approximate each female end 106 and male end 104. The hinged pockets 124 and locating holes 126 are included in the bottom surface 114 in order to optionally be able to subsequently precision cut the ends for placement of a hinge into hinged pocket 124.

Referring now to FIGS. 19 to 23 the assembled curved section 111 is rotated so that the top surface 112 is oriented upwardly. The assembled curved section 111 is then fed through a profiling machine which has a profiling tool 116 for milling a profile into top surface 112 resulting in a profiled top surface 110. The interference connection 108 holding together the four curved sections 102 is sufficiently rigid and strong enough in order for the assembled curved section 111 to pass through the profiling machine, wherein the profiling tool 116 will mill a profiled top surface 110 onto the assembled curve section 111.

Figure 23:
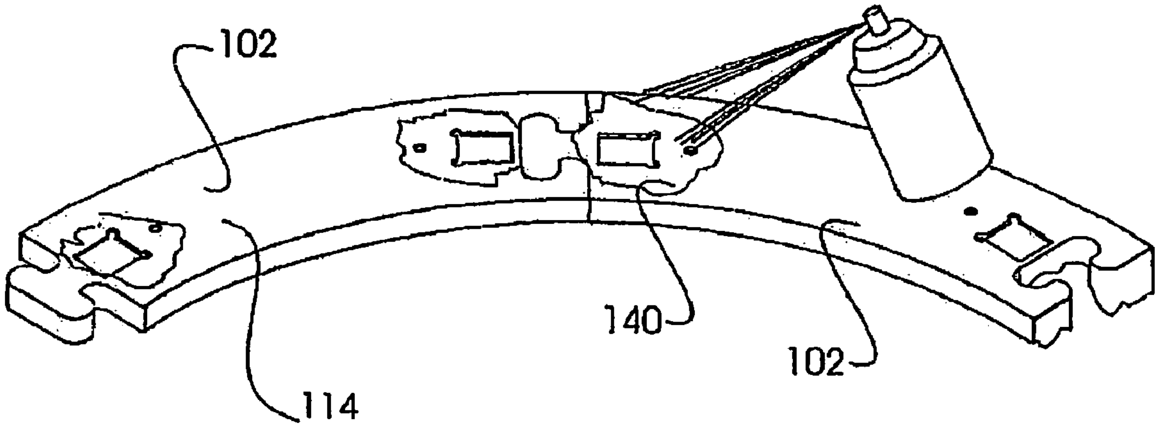
FIG. 23 schematically depicts the bottom surface of the arch section being painted.

Optionally the assembled curved section 111 is turned over to expose bottom surface 114. The entire bottom surface 114 may be painted or just specific areas 140 such as the hinge pockets as shown in FIG. 23.

Figure 24:
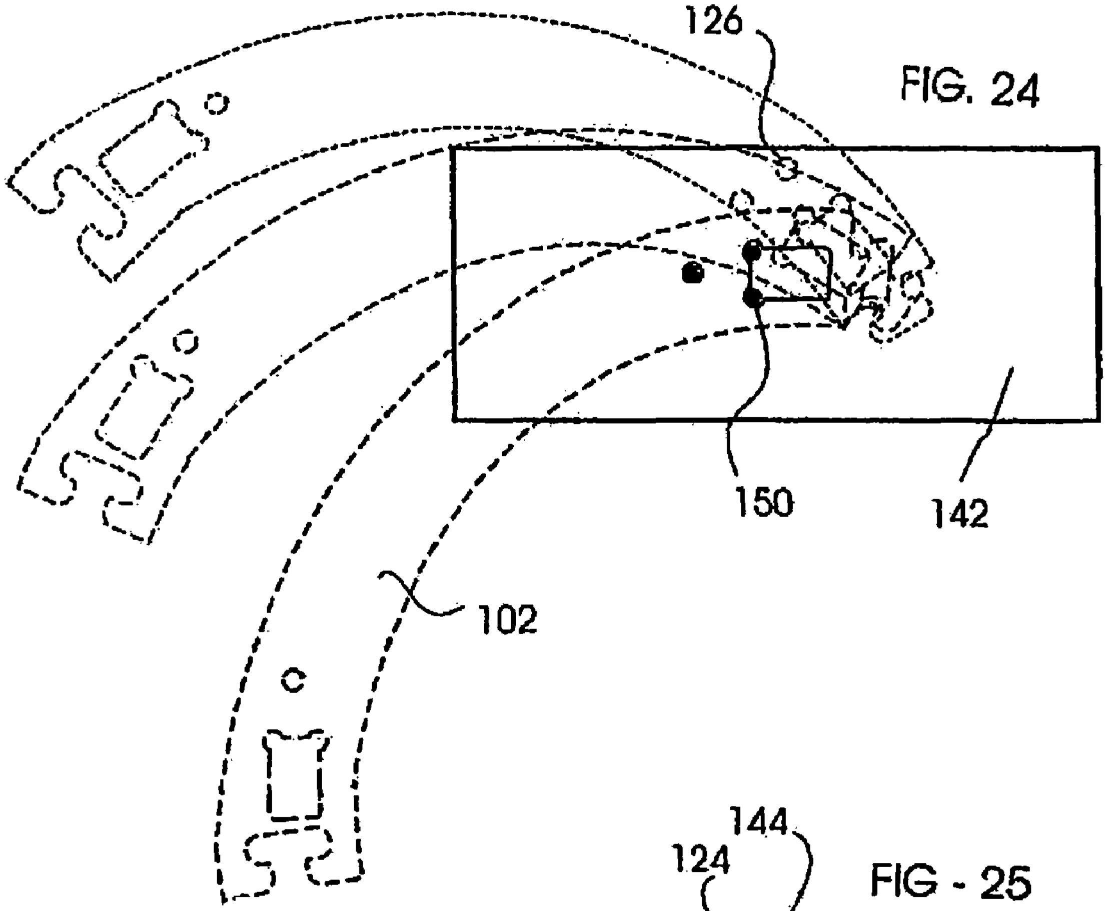
FIG. 24 shows the curved section being placed into a fixture for subsequent precision cutting.
Figure 25:
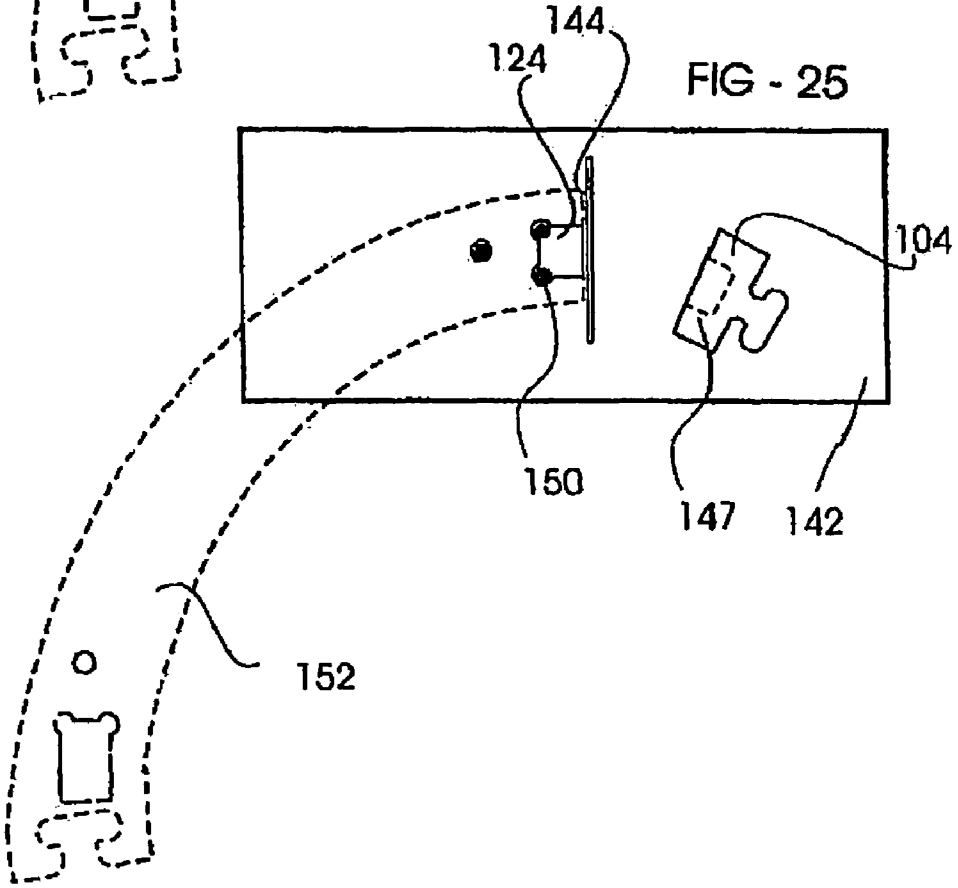
FIG. 25 shows the arch section mounted into a fixture with a waste end having been precision cut off at a precision cut end.
Figure 26:
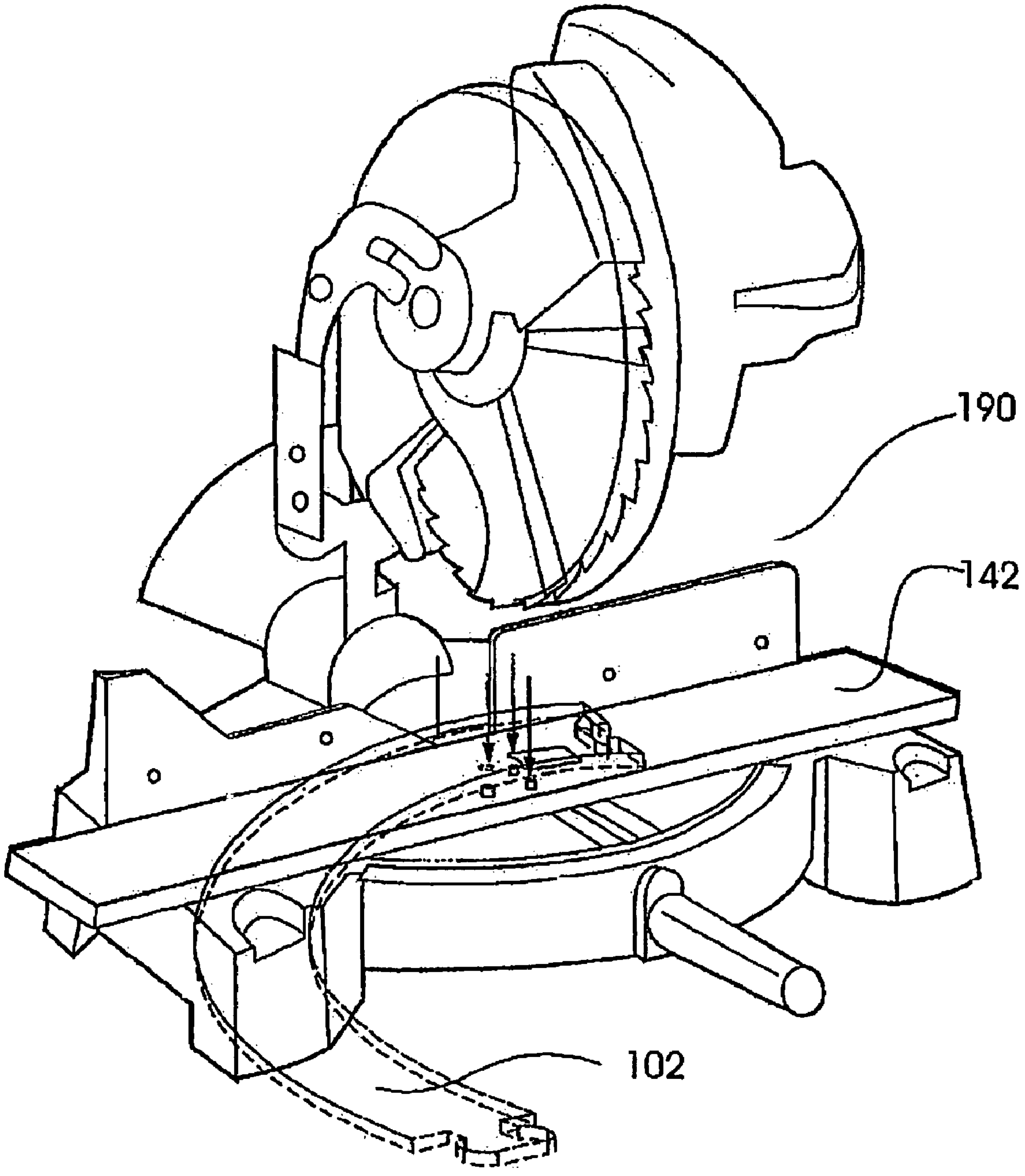
FIG. 26 shows an arched curved section being mounted into a fixture, together with a cut off saw.
Figure 34:
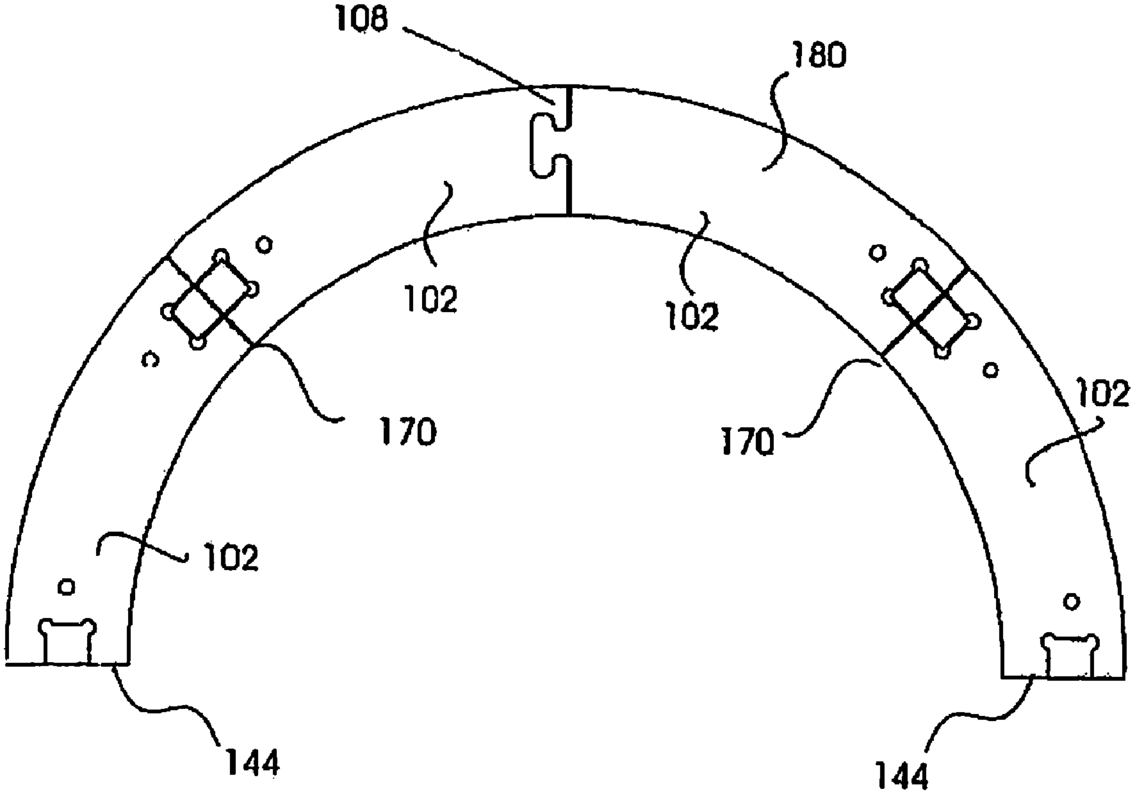
FIG. 34 is a bottom plan view of four curved sections joined together at hinged connections and an interference connection in the center.
Figure 35:
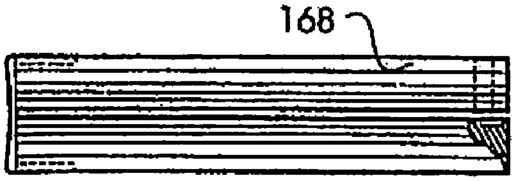
FIG. 35 is a side elevational view of two curved sections in the fold position.
Figure 36:
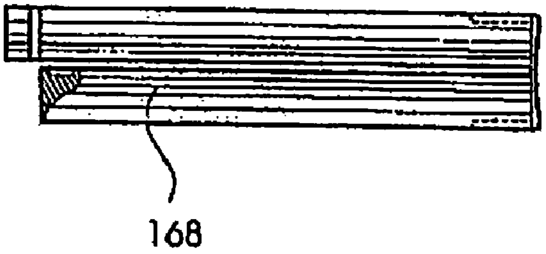
FIG. 36 is a side schematic perspective view of two curved sections hinged together in the folded position.

The finished assembled curved section may be constructed with hinged joints 170 as well as interference joints 108 as shown in FIG. 34. In the case when hinged joints are used the assembled curved section 111 is disassembled and the ends to be hinged together are precision cut as depicted in FIGS. 24 to 26. The curved sections are then reassembled as shown in FIGS. 27 to 36.

Figures 27, 28, 29, 30, 31, 32, 33:
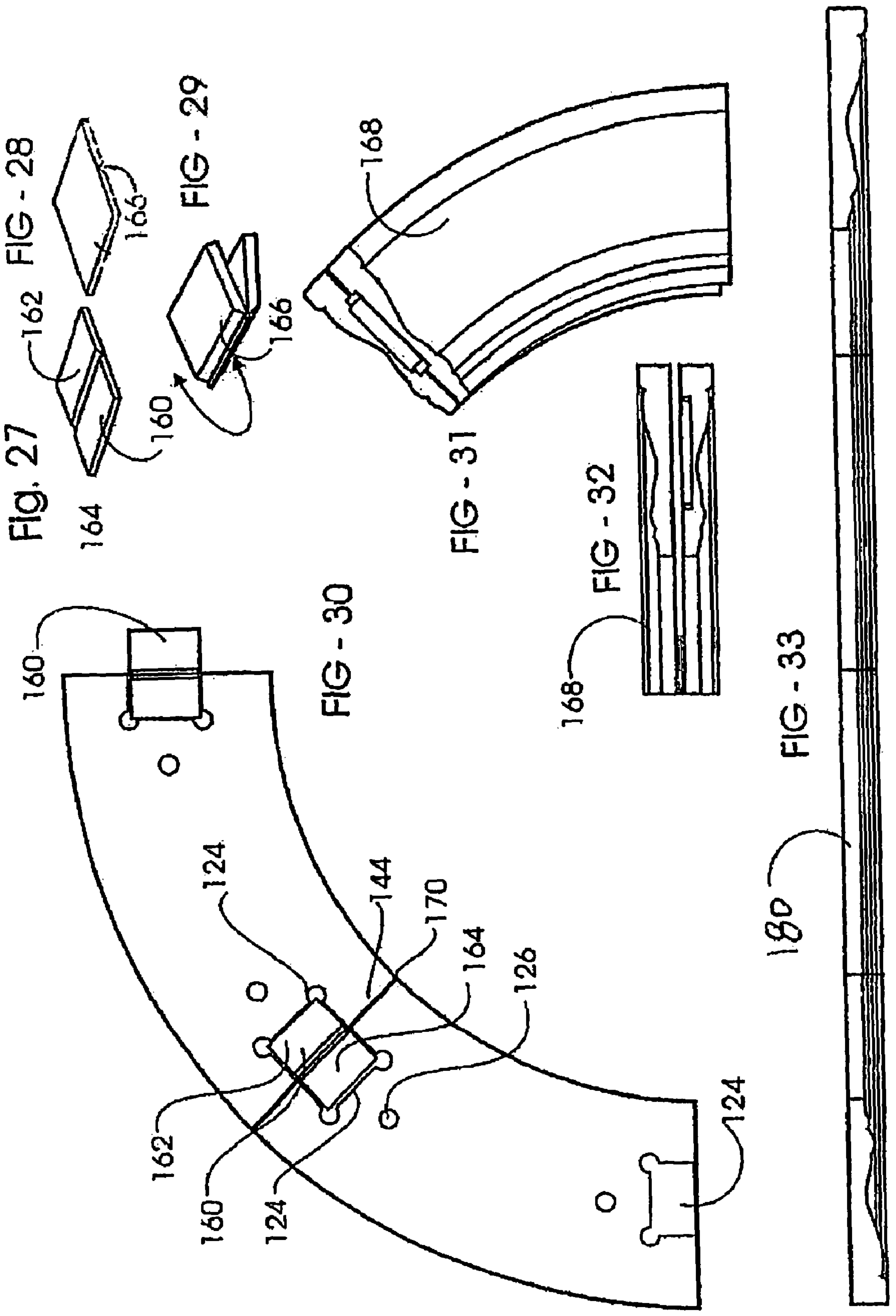
FIG. 27 is a top schematic perspective view of the hinge.
FIG. 28 is a bottom schematic perspective view of the hinge.
FIG. 29 is a side schematic perspective view of the hinge partially folded.
FIG. 30 is a top schematic perspective view of two curved sections hinged together.
FIG. 31 is a side schematic plan view of two curved sections folded together.
FIG. 32 is a side schematic elevational view of two curved sections folded together.
FIG. 33 is a side schematic elevational view of a curved section in an unfolded position.

Precision cutting is now described. Referring now to FIGS. 24 and 25, a curved section 102 is shown in FIG. 24 being placed onto locating pins 150 of cut off fixture 142. Curved section 102 is moved into position, such that the locating holes 126 register with the locating pins 150 in order to put curved section 102 into a locked position 152 as shown in FIG. 25. The fixture 142 is best viewed in FIG. 26 and is connected to a cut off saw 190. In locked position 152, curved section 102 can be precision cut along precision cut end 144, thereby cutting off waste end 147. The ends of curved section 102 are cut off, for example if one wishes to hinge together two curved sections as show in FIG. 30. In FIG. 30 two curved sections which have been precision cut are hingeably attached together by adhesively bonding or in any other manner attaching the hinge 160 into hinge pockets 124. In this manner two adjacent curved sections 102 can be hingeably attached together using a hinge 160. The two curved sections 102 can be folded together into the folded position which is shown as 168 in FIG. 31 or 35 or the unfolded position in FIG. 33 or 34 shown as unfolded position 180. Hinge 160 creates hinge connection 170. Hinge 160 includes a hinge line 166, a right side 162 and a left side 164 of the hinge. FIG. 31 shows two curved sections 102 in the folded position as also in FIG. 32.

FIG. 34 schematically depicts four curved sections connected together having an interference connection 108 in the center and two hinged connections 170 on either side. In this manner, the interference connection 108 can be disconnected and the two hinged connections can then be folded one on top of the other to provide for a very compact product for shipping.

What is claimed is:

1. A method for profiling and manufacturing curved arches comprising the steps of:

a) cutting out the outer dimensions of individual curved sections from sheet material, each curved section including an outer radius, an inner radius, a top surface, a bottom surface, a male end and a corresponding female end, wherein the ends adapted to releasably join together;

b) assembling together the individual curved sections by joining end to end male ends with female ends to form an assembled curved section; and c) milling a profile into the top surface of the assembled curved section thereby resulting in an assembled curved section with a profiled top surface.

2. The method for profiling and manufacturing curved arches claimed in claim 1 wherein the step a) includes the steps of:

a) placing the sheet material on a CNC milling machine;

b) milling the outer dimensions of each curved section;

c) removing the individual curved sections from the sheet material.

3. The method for profiling and manufacturing curved arches claimed in claim 1 wherein the step b) includes the step of urging a male end into a female end with hand pressure thereby creating an interference fit which maintains the two urged ends connected together.

4. The method for profiling and manufacturing curved arches claimed in claim 1 wherein the step a) further includes the step of milling out locating points and hinge pockets in the bottom surface and proximate each end.

5. The method for profiling and manufacturing curved arches claimed in claim 4 further includes steps of:

a) disassembling the male and female ends;
b) placing individual curved sections into a cut off fixture by registering the locating points with locking points in the cut off fixture; and
c) cutting the end of the curved section that is in the cut off fixture to produce a precision cut end.

6. The method for profiling and manufacturing curved arches claimed in claim 5 further includes the step of installing hinges in the hinge pockets of adjacent curved sections thereby assembling hingeably together adjacent curved sections to form a curved arch.

* * * * *